United States Patent
Synytskyy

(10) Patent No.: US 10,887,253 B1
(45) Date of Patent: Jan. 5, 2021

(54) MESSAGE QUEUING WITH FAN OUT

(71) Applicant: Amazon Technologies, Inc., Seattle, WA (US)

(72) Inventor: Mykyta Synytskyy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 700 days.

(21) Appl. No.: 14/561,067

(22) Filed: Dec. 4, 2014

(51) Int. Cl.
*H04L 12/58* (2006.01)
*H04L 12/863* (2013.01)

(52) U.S. Cl.
CPC ............ *H04L 51/02* (2013.01); *H04L 47/622* (2013.01)

(58) Field of Classification Search
None
See application file for complete search history.

(56) References Cited

U.S. PATENT DOCUMENTS

| | | | | |
|---|---|---|---|---|
| 6,226,641 B1 * | 5/2001 | Hickson | ............ | G06F 21/6218 |
| 7,461,403 B1 * | 12/2008 | Libenzi | ............ | H04L 63/145 709/224 |
| 2006/0080657 A1 * | 4/2006 | Goodman | ............ | G06F 9/5061 717/177 |
| 2006/0149840 A1 * | 7/2006 | Thompson | ............ | H04L 47/822 709/224 |
| 2007/0118601 A1 * | 5/2007 | Pacheco | ............ | H04L 47/6245 709/206 |
| 2007/0156842 A1 * | 7/2007 | Vermeulen | ........ | G06F 17/30212 709/217 |
| 2010/0057835 A1 * | 3/2010 | Little | ............ | H04L 67/16 709/203 |
| 2011/0219106 A1 * | 9/2011 | Wright | ............ | G06F 15/173 709/223 |
| 2012/0317579 A1 * | 12/2012 | Liu | ............ | G06F 9/5072 718/104 |
| 2014/0019706 A1 * | 1/2014 | Kanfi | ............ | G06F 17/30082 711/171 |
| 2014/0068635 A1 * | 3/2014 | Holzleitner | ............ | G06F 9/546 719/314 |
| 2014/0279826 A1 * | 9/2014 | Dave | ............ | G06F 17/30563 707/602 |

(Continued)

OTHER PUBLICATIONS

IBM WebSphere MQ Application Programming Guide (SC34-6939-01), [online], Jan. 2009. [retrieved on Jun. 19, 2017]. Retrieved from the Internet <URL: https://www-05.ibm.com/e-business/linkweb/publications/servlet/pbi.wss?CTY=US&FNC=SRX&PBL=SC34-6939-01>.*

(Continued)

*Primary Examiner* — Sm A Rahman
*Assistant Examiner* — Dae Kim
(74) *Attorney, Agent, or Firm* — Davis Wright Tremaine LLP

(57) ABSTRACT

Current distributed message queuing services are designed to share resources in order to fulfill greater amounts of information; however, resource sharing often leads to correlated failures, task distribution problems, and misaligned load balancing of those shared resources. By maintaining a queue of publish request messages to be retrieved by message processors when the workload of the message processors is available, the enqueued messages are processed and fanned-out in order to provide information in the messages to the subscribers without latency or loss of data.

20 Claims, 9 Drawing Sheets

(56) References Cited

U.S. PATENT DOCUMENTS

| | | | |
|---|---|---|---|
| 2014/0324959 A1* | 10/2014 | Hudson | H04L 47/623 |
| | | | 709/203 |
| 2014/0344327 A1* | 11/2014 | Lovric | H04L 67/2804 |
| | | | 709/203 |
| 2016/0205142 A1* | 7/2016 | Arkin | H04L 67/18 |
| | | | 726/1 |

OTHER PUBLICATIONS

"RabbitMQ tutorial—Publish/Subscribe". RabbitMQ Tutorials [online]. Oct. 21, 2014 [retrieved on May 23, 2017]. Retrieved from the Internet: <URL: https://web.archive.org/web/20141021014623/https://www.rabbitmq.com/tutorials/tutorial-three-java.html>.*

* cited by examiner

MESSAGE QUEUING WITH FAN OUT

BACKGROUND

Modern systems often require numerous computing resources. An organization may, for example, utilize numerous servers, data stores, and other resources in its operations. An organization using computing resources to provide a service, perhaps through a website, for example, may configure its systems with redundancy to decrease the likelihood of the service becoming unavailable due to a failure of one or more of the computing resources. Multiple servers may be redundantly configured such that, if one or more servers stop functioning, the remaining servers will be available. Generally, organizations may utilize multiple computing resources, whether redundantly or not, in their operations.

Sharing resources, however, can also have disadvantages. If a resource becomes unavailable, those sharing the resource may be adversely affected. For example, if a host loses power, malfunctions, or otherwise stops working, virtual machines implemented by the host may collectively stop functioning as a result. In other words, when a resource is shared, the possibility of correlated failure becomes an issue. In addition, task distribution can become uneven, causing significantly disproportionate load on resources, which can result in increased latency for some tasks and underutilized resources.

BRIEF DESCRIPTION OF THE DRAWINGS

Various embodiments in accordance with the present disclosure will be described with reference to the drawings, in which.

DETAILED DESCRIPTION

Figure 1:
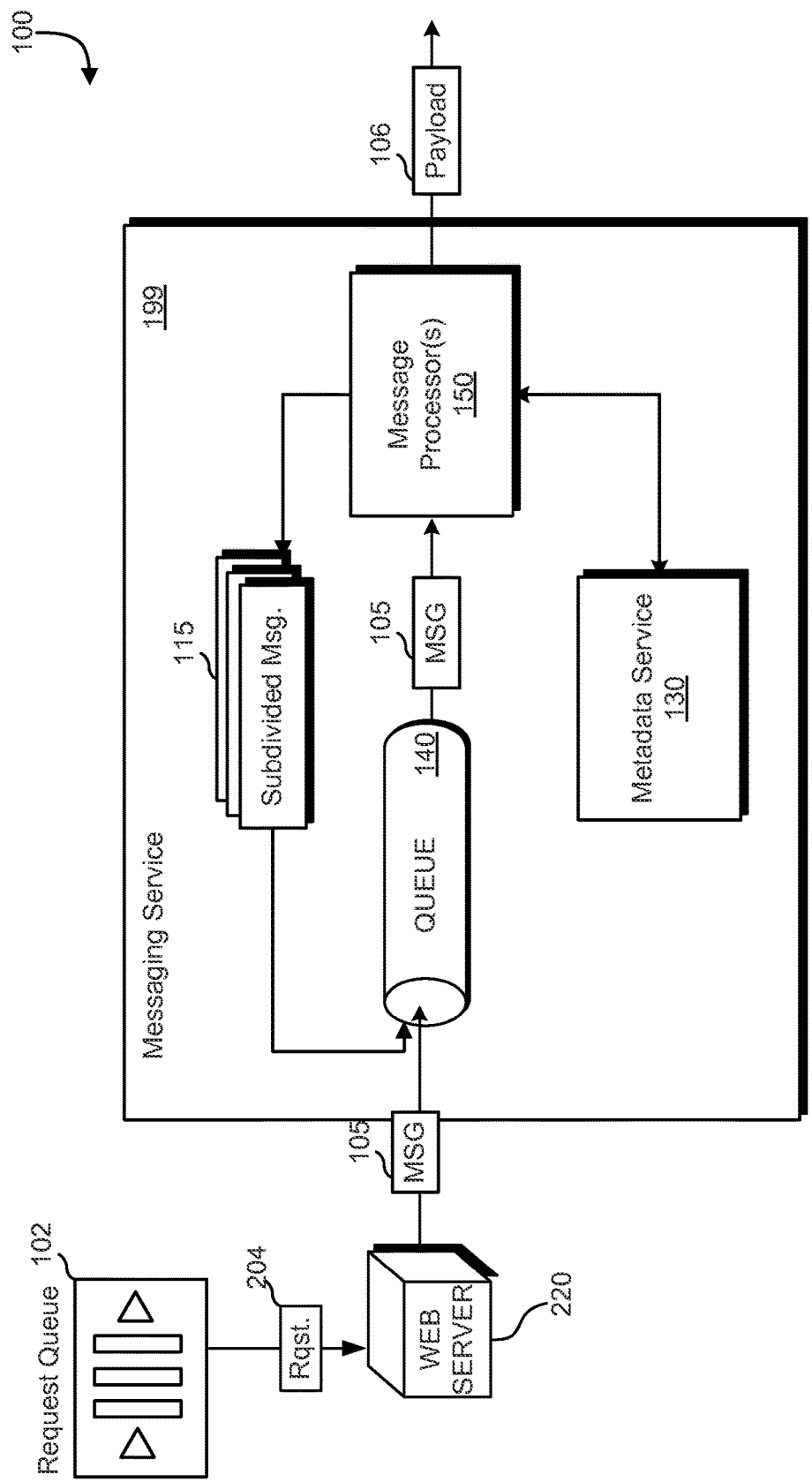
FIG. 1 is an illustrative example of an environment of a notification service in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and processes for storing, reading, and managing distribution of information across multiple hosts to effectively distribute workload using workload splitting across multiple hosts or instances so as not to overwork or overload any specific host/instance. In particular, a publication-subscription system employing messaging queues to apportion workload across multiple instances to read, serve, process, and/or deliver messages to endpoints is described herein. The publication-subscription system may include multiple components operably interconnected to provide for queuing, processing, and attempted delivery of message payload published to a topic of a publisher. For example, the publication-subscription system may include a frontend system, a queue system, and a plurality of message processors employed as a system to receive a publish request message from a publisher and deliver the message payload to the subscriber via apportioning workload across some or all of the systems.

A publication-subscription service is configured to use a computing resource service provider to support a message queuing service to provide publication messages to endpoints of the service. An endpoint may be, for example, identified by an email address or an identifier of a queue in a queue service. An endpoint can be registered to a certain topic, thereby creating a subscription in that topic. When a message is published to that topic, the message may be transmitted to that topic in accordance with a protocol associated with the endpoint (e.g., an electronic mail protocol for an email address endpoint). Additional delivery methods are available in accordance with example embodiments; for example, the delivery of the messages any protocol (for example, Hypertext Transfer Protocol (HTTP), e-mail, and short message service (SMS), among others).

Each time a publisher publishes additional messages to the topic, the additional messages may be transmitted to every endpoint subscribed to that topic, such that each endpoint subscribed to that topic would receive that message (or the payload of the message). The service is capable of supporting topics with large numbers of subscribers based on implementing a fan-out model to fan-out the message into fragments. In some example embodiments, for the service to support such a large amount of subscriptions, topics are sub-divided into parts, referred to as "fragments," where a topic consists of zero or more fragments. In each fragment, zero or more subscriptions may be stored, such that a subscriber identifier is stored for each subscription, where the identifier corresponds to an endpoint protocol and any information necessary to create a connection with the endpoint using that protocol that is useful and/or necessary for delivery of the message.

A single fragment can be assigned to a single computer instance, or the like, such that only that instance is configured to provide information and address situations concerning that fragment. Depending on the number of subscriptions in the topic, a publish request message (PRM) published to the topic may go through several sub-dividing iterations in order for a fragment of the topic to become small enough for a single computer instance to address all of the requirements and processing of that one fragment. For example, a small fragment may be one that is able to be processed in real-time or near real-time by a single computer instance without causing undo delay in delivery of a message or causing a lost message incident to occur. In some example embodiments, a small PRM may be delivered or attempted to be delivered directly from the queue to the subscribers when the number of subscriptions is low. However, when either and/or both the initial PRM (which is as of a result of a customer request to publish) and the fanned PRM (which is the result of a message processor making the determination to fan a PRM that the message processor retrieved from the queue in order to process the message). The fanned PRM may be included as a part of the fan-out model to fan-out a message into fragments. Once the fragments have been successfully and fully subdivided according to a hierarchical division of fragments across multiple hosts, the message, or more specifically the payload of the message, may be delivered to all of the subscribers of that topic or that fragment.

FIG. 1 is an example embodiment of an environment 100 for implementing aspects in accordance with various embodiments. As will be appreciated, although an Internet environment 100 is used for purposes of explanation, different environments may be used, as appropriate, to implement various embodiments. As illustrated in FIG. 1, the environment includes a front-end web server 120, a request queue 140, a message processor 150, and a metadata service 130. The components of the environment 100 may be implemented using a single physical computer system, although some components may be implemented on different computer systems that are able to communicate over a network.

In various embodiments, human users and non-human users (e.g., services, mobile applications, queue service application programming interface entities, etc.) may be subscribers or have a subscription to one or more topics from one or more publishers of a topic. Subscribers may have a subscription to a publisher generally, or, more frequently, a subscription to a specific topic of the publisher using a publication-subscription model for gathering and consuming data. For example, a publisher may be a database server, computer or distributed system of computers configured to maintain publications of topics, such as logically related data sets or subjects, to make available to other servers, nodes, etc. The publisher may be configured to detect data changes in the topics and maintain publication information to publish to the topic whenever there is a change in the topic. The publisher may maintain a publication database or store that is a source of data and/or database object related to the topic requested by a subscriber. In alternative embodiments, a publication-subscription management service may be used by the publisher to publish a message to the topic via the management service.

A subscriber may be database server, computer, mobile application, queue service entities, human-users using a device, or distributed system of computers configured to receive notifications, updates, and subject matter related to a topic published or replicated by a publisher or other data source, to which the subscriber subscribes. It is noted that generally, a "publisher" is a producer of content and a "subscriber" is a consumer of content; however, applications are not limited to the role of subscriber or publisher, and are frequently both a publisher and subscriber of content.

The messaging service 199 may be a collection of computing resources configured to enable customers 102 to store one or more messages in queues for use by one or more services provided by a computing resource service provider; for example, the computing resources may include a database, a server, a container, etc. The messaging service 199 may be a collection of computing resources configured to enable customers, such as customer 102 to send and receive notifications through a communications network 100. A customer 102 may utilize a client interface 103 of a user's device 101, when the customer is a human user, to create or subscribe to one or more subjects to which one or more messages may be published through the messaging system. For instance, a customer 102 may use the client interface to create a new topic and subscribe to this topic by specifying that any messages published to the topic may be transmitted to a particular location, referred to as an "endpoint" (e.g., electronic mail address, one or more servers, an existing queue within the managed queuing service, etc.). Accordingly, when a customer 102 publishes a message to the topic, the message may be transmitted to each subscriber subscribed to the topic. The messaging service 199 may cause the delivery of the messages any protocol (for example, Hypertext Transfer Protocol (HTTP), e-mail, and short message service (SMS), among others). The messaging service 199 may provide notifications using a "push" mechanism without the need to periodically check or "poll" for new information and updates.

The messaging service 199 may include or be operably interconnected with one or more queues 140 that may be configured to store messages while components of the service become available for processing the messages. For example, a message processor 150, such as a processing instance, computer, server, container, or other processor, becomes available to accept the workload to process the message and deliver the payload 106 of the message 105 to the endpoint of the subscriber (not shown). The request queue 140 may be a data structure or programming module utilizing a queue data structure configured to store messages that correspond to the publish request messages received by the front-end web server and enqueued by the front-end web server or a component thereof. In an embodiment, the front-end web server may be a computer system or a process executing thereon (i.e., instance of a computer program that is being executed) configured to receive publish request messages to publish a message to a topic for delivery to subscribers of the topic. In some embodiments, the front-end web server 120 may include programming logic for validation to filter requests from customers. The front-end web server may also be configured to block improperly formatted requests, malicious requests, or requests being received in excessive numbers. In some embodiments, the front-end web server 120 is configured with load balancing functionality.

The message processor(s) 150 may be operably interconnected to a metadata service 130, which may generally be configured to manage information or data about other, sometimes larger, data, activity, and subscription information. Example embodiments of the metadata service may be implemented in hardware and/or software and may be executed on a computer, distributed system of computers, a server, or other network component, such as a database.

In example embodiments, as the latency of the service may be low, the message queuing service may generally receive, process, and deliver on large numbers of messages. It should be noted that delivery may not always be guaranteed, as some subscribers may have invalid endpoints, such as an invalid email address, and, due to such a failure, delivery may be attempted but the endpoint has no way to complete the delivery process. As such, information or payload of a message may not always be received by a subscriber. An alternative embodiment can guarantee delivery, e.g., by retrying until confirmed or an error condition occurs.

Figure 2:
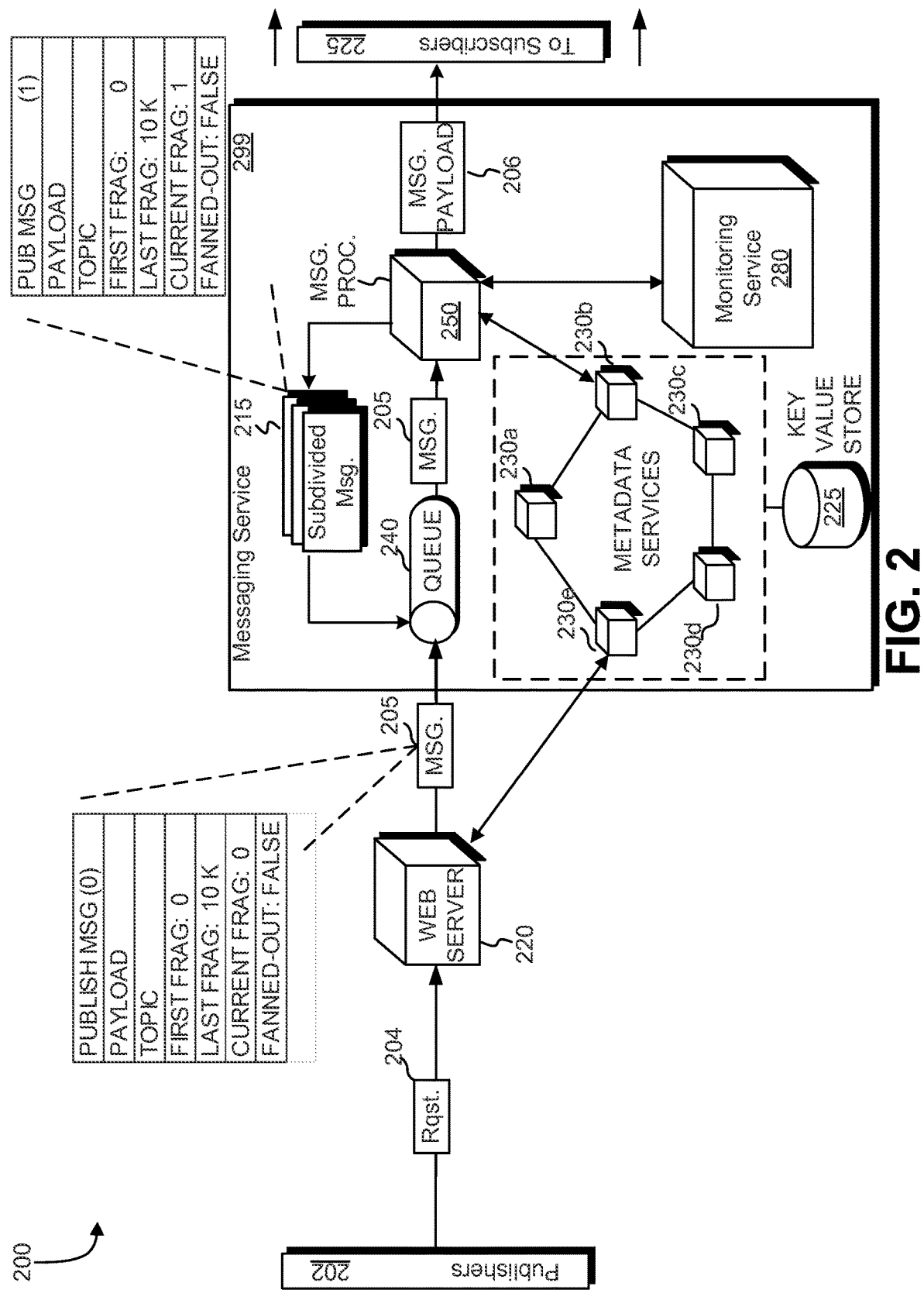
FIG. 2 is an illustrative example of an environment of a publication-subscription model including a queue messaging service in accordance with at least one embodiment.

FIG. 2 is an illustrative example of an environment 200 of a publication-subscription model including a messaging service 299. The system of FIG. 2 provides for a publisher 202 transmitting a request 204 to a web server 220, wherein the request is a publish request message (PRM) to publish a message to a topic and deliver the message to the appropriate subscribers 225. A front-end worker, such as the web server 220, configured to enqueue a message 205 received from the customer 202 onto the message service queue 240. The message may include information that enables a determination of the request and its associated data. For example, the exploded view of the message 205 illustrates at least some data elements in the message, which include the number of the published message, the payload of the message that will ultimately be delivered, a first fragment number of the topic, a last fragment number of the topic, a current fragment number of the topic, and an identifier as to whether the message has been fanned-out in a previous processing of the initial or fanned PRM.

In one example embodiment, a publish request message published to a topic to be delivered to a subscriber of the topic is enqueued or temporarily stored in a queue, such as the message service queue 240, prior to being processed and delivered. A publish request message (PRM) may include several different types of messages; for example, the PRM could be an initial PRM that is a result of the customer 202 request to publish, or a fanned PRM that is a result of a message processor determining to fan an initial or fanned PRM retrieved from the queue.

The messaging service is configured to include a server or a cluster of servers that implement one or more queues, the queues being configured to be used for many storage-related reasons; for example, a message service queue 240 may be used as a queue of work, where each message stored in the queue is a task that is to be completed by some process or processor, such as the message processor 250. The message process may be configured to retrieve messages (or tasks) from the queue and process the message in order to perform the task (e.g., deliver the payload of the message to the subscriber), cause the task to be performed, and/or perform another action based on the message processing.

A metadata service (MDS) may be configured to manage data reading and/or aggregation of metadata of each of the subscriptions and information related to the subscribers maintaining the subscriptions. The MDS is further configured to provide some or all of the metadata, customer data, and/or relevant subscription information necessary or useful for delivering a successful message to the subscriber to a front-end Web server, such that the webservers may forward the message to the appropriate queue for temporary storage and later processing.

The MDS may be operably interconnected with a key value store or other database configured for storing and/or managing large amounts of data that is often needed or used in real-time or near real-time. For example, the key value store 225 may be a NoSQL database configured to provide a mechanism for data storage and retrieval of the data that is modeled in a means other than the tabular relationships used in relational databases. One such reason for using non-relational database storage in some example embodiments is for the speed of access to information in the key value store is not necessary to rely on counting or tabulation in order to retrieve the data. In various embodiments, the key value store may be implemented in a NoSQL data management system, a RDBMS, or any other data storage system, and may further support SQL-like query language. Further, the key value store may further or alternatively be a structured storage database.

A message processor 250 is configured to select a message from the queue for processing and determining if the message is of a size that is manageable for a single message processor to deliver or if the message requires subdividing into a smaller message and requeued for further processing by additional message processors. The message processor is further configured to determine if the message processing is complete and creating a connection with an endpoint of the subscriber for delivering the payload of the message to the endpoint.

Figure 3:
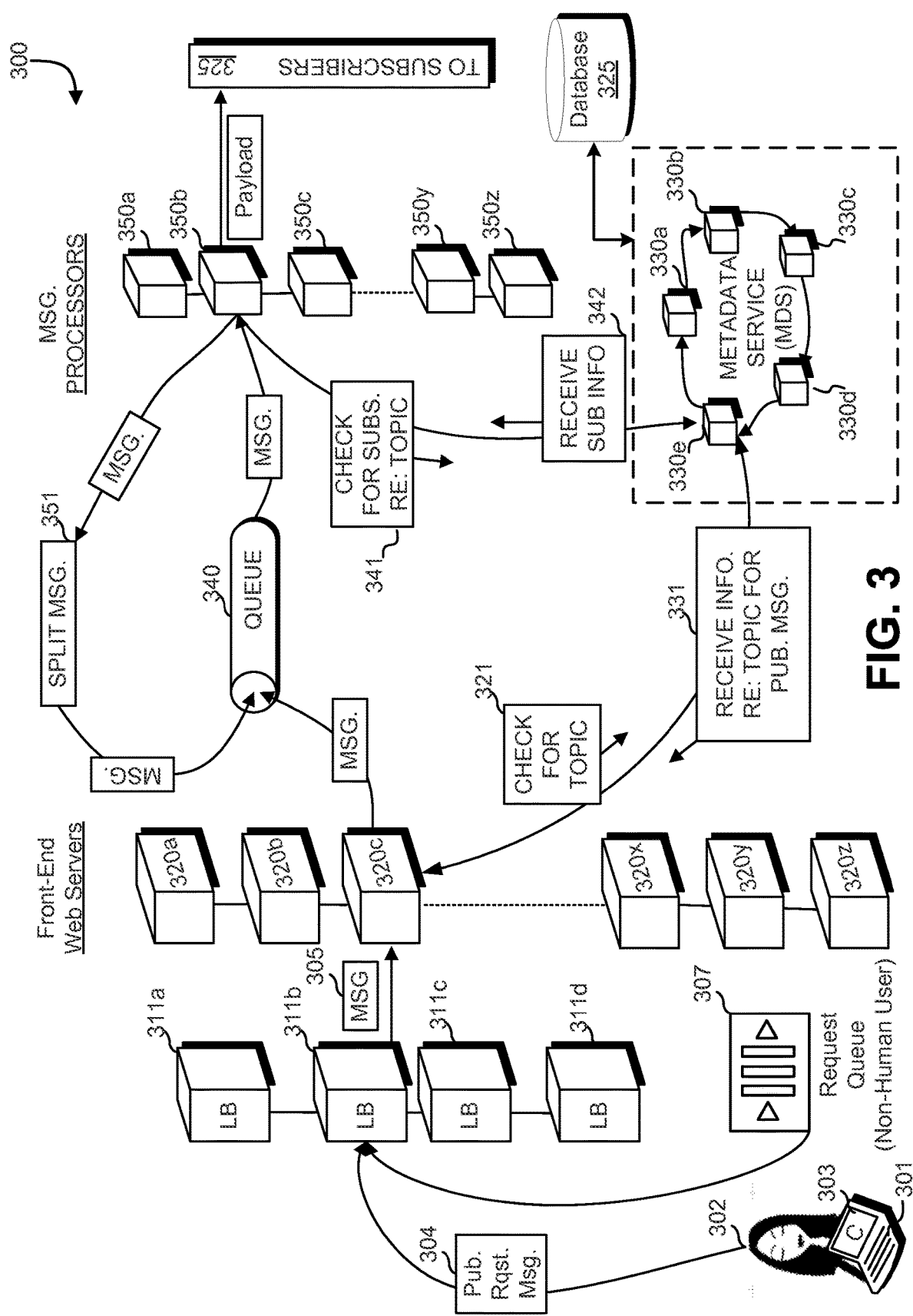
FIG. 3 is an illustrative example of an environment of a publication-subscription service including a messaging queue in accordance with at least one embodiment.

FIG. 3 is an illustrative example of an environment 300 of a publication-subscription service including a messaging queue in accordance with at least one embodiment. A publish request message 304 may be transmitted from a customer's client 303 to front-end web servers 320a-320z via one or more load balancers 311a-311d, which may be configured to determine or consider which front-end web server, or other component, to deliver the publish request message using one or more load balancing techniques. This determination, based on load balancing techniques, may include distributing messages based at least in part on the number of messages or size of message present in each of the front-end web servers, for example. The publish request message (PRM) 304 or the like is transmitted from a customer, such as the human customer 302 via a device 301 and/or non-human customers, such as the request queue 307 to a load balancer of a plurality of load balancers 311a-d. The load balancer provides a service for transferring requests from customers to the web-server to smooth out variation in workload and to increase system availability. In some embodiments, one or more load balancers may not be necessary. For example, when workload is at a sustainable level for the system, such as the workload being around the same or below the average workload of the system, the load balancers may be bypassed when the system availability is sufficient to address the publish request messages. The load balancers are configured to receive requests 304 from customers and forward a message 305 to front-end web servers 320a-z for processing according to the service.

The web servers 320a-z sends a message 321 to the MDS to request that the topic be confirmed as an active topic that currently exists and receives a response 331 from the MDS providing confirmation of the topic and information regarding the topic and subscription for forming a cohesive publish message to provide to the subscribers. The web servers then provide the message to the queue 340 for temporary storage until the message is retrieved by a message processor 350a-z for processing. A message processor with available workload may retrieve a message from the queue and send a message 341 to the MDS to request subscription information related to the subscriptions responding to the topic. The MDS provides the message processors with a response message 342 providing subscription information such that the processors may deliver the message payload to the subscribers at the determined time. The message processors then determine whether there a small enough number of subscribers that the one processor may deliver the message to each of the subscribers, or whether the message needs to be split into sub-messages 351, which are then reentered into the queue 340 and processed again.

Example embodiments include a messaging service including a server or a cluster of servers that implement one or more queues, the queues being configured for a publication-subscription system. For example, the messaging service being a distributed queue messaging service to provide notifications or messages to one or more servers or instances, such as message processors 350a-z. An instance, which may come in a variety of sizes, may be a database partition (commonly referred to as a database shard or shard) that may be a division of a logical database or the constituent elements of the logical database into distinct, independent parts. Generally, database partitions are held on separate database server instances in order to help balance traffic and work load, while some embodiments maintain two or more partitions on the same server instances. Data being stored in database partitions may be stored and/or accessible only to a single partition, in which case that partition act as the only source for that subset of the data. In the example embodiment of FIG. 3, the message processors serve as the instances or shards for maintaining messages in partitions, such that one shard is assigned to one fragment in order to process the message and deliver it to each of the subscribers of that fragment.

A major factor limiting speed, efficiency, and accuracy for processing and delivering messages to subscribers in response to a publication request message is the amount of aggregate computing power available for a system. Example embodiments disclosed herein describe methods for apportioning work among computers or instances within the service, such as the metadata services (MDS) 330a-e. Work may include two primary forms of work that need to be performed. The first form of work is reading and serving the metadata about a customer's topic, subscriptions, such as how many subscriptions exist, what customers are subscribed to what topics, and other workload related to reading the subscription information from a storage medium, such as the database 325, which may be a NoSQL data management system, key value store, or the like. The second form of work includes creating and/or initiating network connections with the endpoints of the subscriptions and delivering the payload of the message to each endpoint in a timely and effective manner (e.g., ensuring that every endpoint is reached and/or no endpoint receives multiple copies of the same message).

Alternative example embodiments of the messaging service may be a managed message queuing service configured to enable transmission of any volume of data, at any level of throughput, without, generally, losing messages or portions of messages. For example, such a message queueing service according the example embodiments may be configured on data centers for operating and/or scaling messaging clusters, where, in some example embodiments, all messages may be stored redundantly across one or more servers or data centers in the same or different geographical location.

Figure 4:
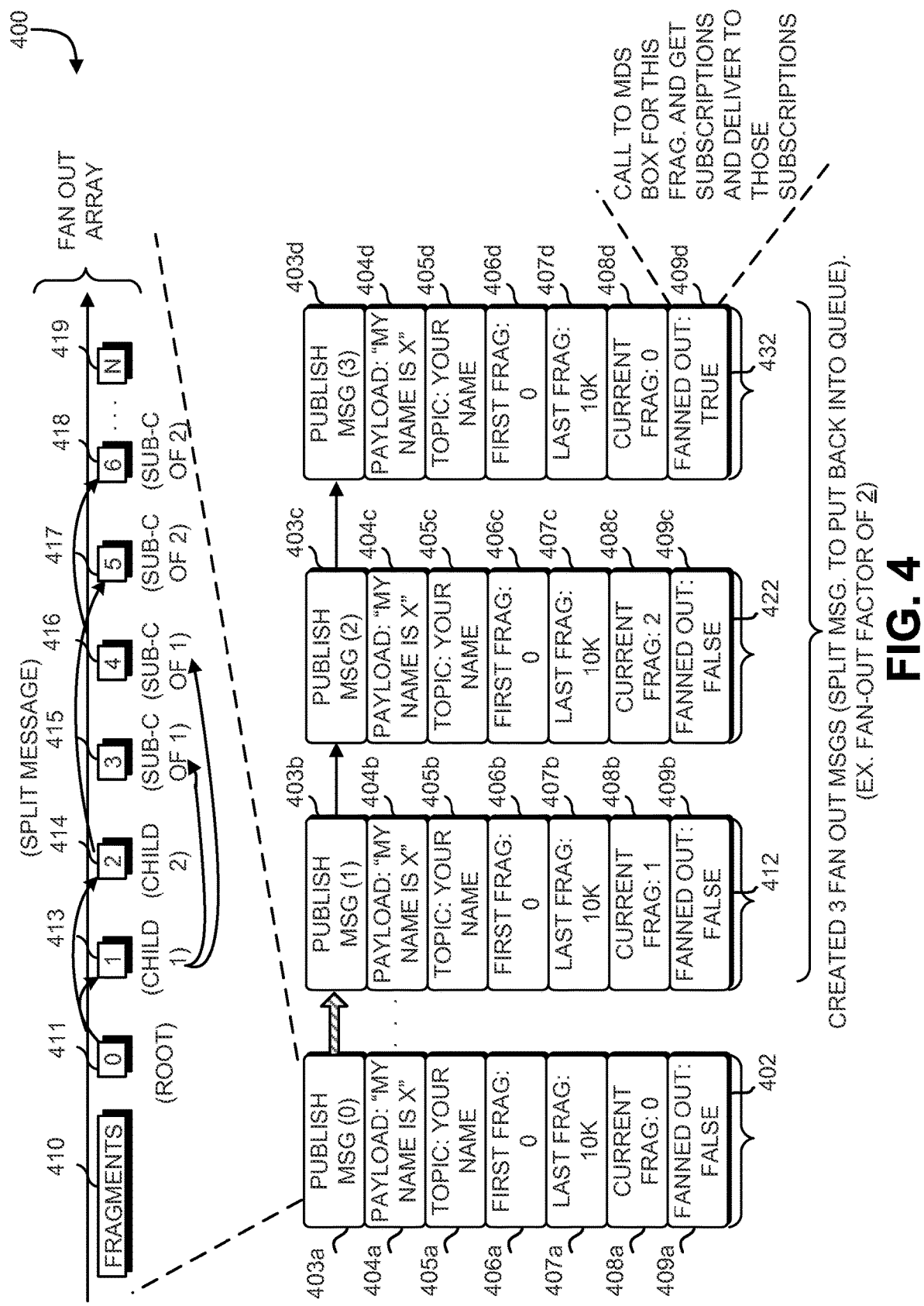
FIG. 4 is an illustrative example of a block diagram depicting a fan out array of fragments in accordance with at least one embodiment.

FIG. 4 is an illustrative example of a block diagram 400 that depicts fragments of topics being sub-divided according to example embodiments presented herein.

In an example embodiment, four messages are displayed, messages 402, 412, 422, and 432, where message 402 is publish message 0, meaning it is the initial publish request message transmitted from a customer to a service, and publish messages 1, 2, and 3 are subsequent fanned-out messages from the initial PRM. Each message includes the publish message number 403a-d, the payload 404a-d, the topic 405a-d, a first fragment number 406a-d, a last fragment number 407a-d, a current fragment number 408a-d, and a fanned-out variable, also referred to as a fan-out indicator, 409a-d. It is noted that the instant example of FIG. 4 is expressing a binary tree; however, a degree higher than 2 may be used for the tree; and, each node in the tree may have a different degree, in some embodiments. For example, a tree may have a fan-out of 3, 4, 9, 15, or other values in various embodiments. For example, a fanned-out publish request message indicates a level in a hierarchy, the hierarchy provides for PRMs that have been processed and those that have not been processed, and the hierarchy provides for a type of ordering or levels that, at least conceptually, provide the idea of layers or direction as to what PRMs must be processed. A hierarchy may be a list, an array, a tree, or the like.

Generally, the publish message contains enough information to perform most of a fan-out, meaning, the message provides enough information to split the first message into smaller sub-messages without having to communicate with the metadata service or key value store, which both take time and computational resources that make a publication-subscription message model difficult when attending to real-time or near real-time notifications.

For example, when a message processor, such as the message processor 250 depicted and described in connection with FIG. 2, retrieves a message from the queue, the message processor can read the data provided in the message, such as publish message (1) 412 and determine the topic, first fragment, last fragment, current fragment, and fanned-out status. The current fragment is listed as 1 and fanned out is marked as false, which means the message is the second message and it is not completed (e.g., there are more children to process). Whereas, publish message (3) 432 lists the fanned out status as true, which means there are no more children to process after that fragment, and, thus, the message may be delivered to each of the subscribers. Once the fanned out status is indicated as true, meaning no more children to assign tasks, the message processor is configured to call to the MDS and request the subscription information for the fragment, thereby enabling the message to be delivered.

Further example embodiments depicted in FIG. 4 include an exploded image of a fan out array of the fragments 410. For example, the fragments are viewed as an array and as the fragments are numbered, a tree-structured prong can be applied. The fan out array may be viewed as a root (0) 411, a first child (1) 413, a second child (2) 414, a first sub-child of the first child (3) 415, a second sub-child of the first child (4) 416, a first sub-child of the second child (6) 417, and a second sub-child of the second child (6) 418. Based on this information, one can compute the next child of any given point in the tree.

Figure 5:
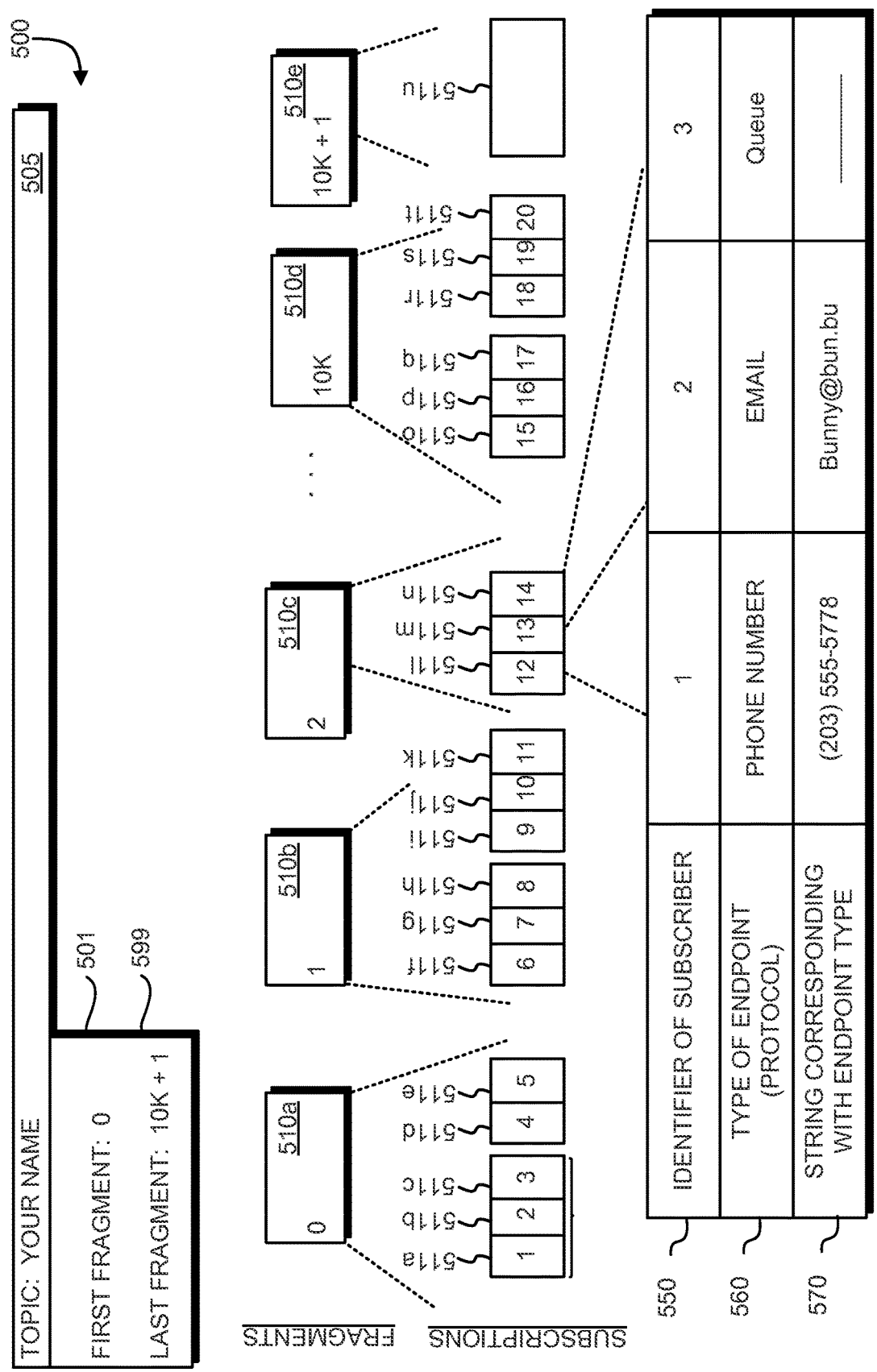
FIG. 5 is an illustrative example of a block diagram depicting the relationship between fragments and subscriptions in accordance with at least one embodiment.

FIG. 5 is an illustrative example of a block diagram 500 depicting the relationship between fragments and subscriptions in accordance with at least one embodiment. In example embodiments of the messaging service, such as a distributed queue messaging service, a messaging pattern, commonly referred to as a "fan-out," is used to model one or more information exchanges to one or multiple destinations, such as endpoints of subscriptions to a service or topic. Fanning-out generally implies the delivery or spreading of a message to multiple destinations without having to halt or pause the message delivery process.

A publication-subscription system or notification service is configured for subscribing endpoints to a topic and delivering messages or notifications having been published to that topic to each endpoint. The service is further configured to subdivide each topic, when necessary to maintain a certain workload per each instance, into any number of fragments (e.g., parts of the whole topic) and fan-out publication request messages to any number of computer instances as necessary to support topics with essentially unlimited numbers of subscriptions without losing messages or delivering too many copies of a single notification to an endpoint.

In some example embodiments, for the service to support such a large amount of subscriptions, topics are sub-divided into parts, referred to as "fragments," where a topic consists of zero or more fragments. In each fragment, zero or more subscriptions may be stored, for each subscription, a subscriber identifier is stored, where the identifier corresponds to an endpoint protocol and any information necessary to create a connection with the endpoint using that protocol that is useful and/or necessary for delivery of the message. Specifically, in the example embodiment of FIG. 5, a topic 505, entitled "YOUR NAME" includes information related to the first fragment 501 and the last fragment 599, where the last fragment number may be updated when new fragments are added. The topic 505 is divided into fragments 0-10,001 (510a-e), which begins with the first fragment number being 0 and incrementing by one all the way to 10,001.

Each of the fragments includes a number of subscriptions. Fragment 510a has five subscriptions subscribed to it, namely subscriber identifiers 1-5 (511a-e), fragment 510b has six subscriptions subscribed to it, namely subscriber identifiers 1-6 (511f-511k), fragment 510c has three subscriptions subscribed to it, namely subscriber identifiers 1-3 (511l-511n), fragment 510d has six subscriptions subscribed to it, namely subscriber identifiers 4-9 (511o-511t), and fragment 510e has no subscriptions subscribed to it, and is there as a new fragment ready to be filled with subscriptions. Each of the subscriber identifiers 1-9 includes reference to three primary pieces of information that is used for delivering the messages for each specific subscription without having to contact the MDS each time. Specifically, in the example embodiment of FIG. 5, the subscriber identifier 550, the type of endpoint or protocol 560, and a string correspond with the endpoint type 570 are stored in the metadata service and/or key value store. For example, subscriber identifier 1 has an endpoint type of a telephone number, and the string corresponding to the endpoint includes the digits (203) 555-5778; subscriber identifier 2 has endpoint type of email, with the string corresponding to the endpoint being "bunny@bun.bu."

Example embodiments disclose creating a fragment of a topic, and into that fragment inserting the first subscription, such as subscription identifiers 1-5 (511a-511e). As additional customers subscribe in messages from this topic, additional subscriptions are added to the fragment and the process continues until a size limit of the fragment is reached. The fragment size has a soft limit and a hard limit that are imposed for maintaining high quality and workload speed for each instance. The fragment size has two limits; there is a soft limit and a hard limit. A soft limit is imposed to stop attempting to add subscriptions and like when it appears as though the fragment is becoming full and perhaps a new one should be added. A hard limit is imposed such that no additional subscriptions may be added, as the hard limit prevents a fragment from becoming so big that no one computer or instance is able to perform the necessary workload alone.

In some example embodiments, when a new fragment is needed in the topic because all of the other fragments are full with subscriptions, when a new subscriber requests a subscription to that topic, one or more new fragments are created. The message processor is configured to make a call to the metadata service and/or the key value store, which maintain all of the information necessary to populate the new fragment and update the last fragment number.

In the example embodiment of FIG. 5, a single topic 505 is depicted, which includes five fragments (510a-510e), where each of fragments 510a-510d is filled with subscriptions and fragment 510e is empty. However, in fragment management generally, topics and fragments may exist in different arrangements. For example, there may be a topic with no fragments, which generally means that there are no subscriptions or subscribers. There may also be a topic with many fragments, but no subscriptions or subscribers; for example, a topic may exist with many fragments and many subscriptions, all subscribers may then be unsubscribed, but the fragments do not necessarily need to be deleted. In a similar manner, a topic may be created including fragments, but no subscriptions need to be subscribed to those fragments at any given time.

Figure 6:
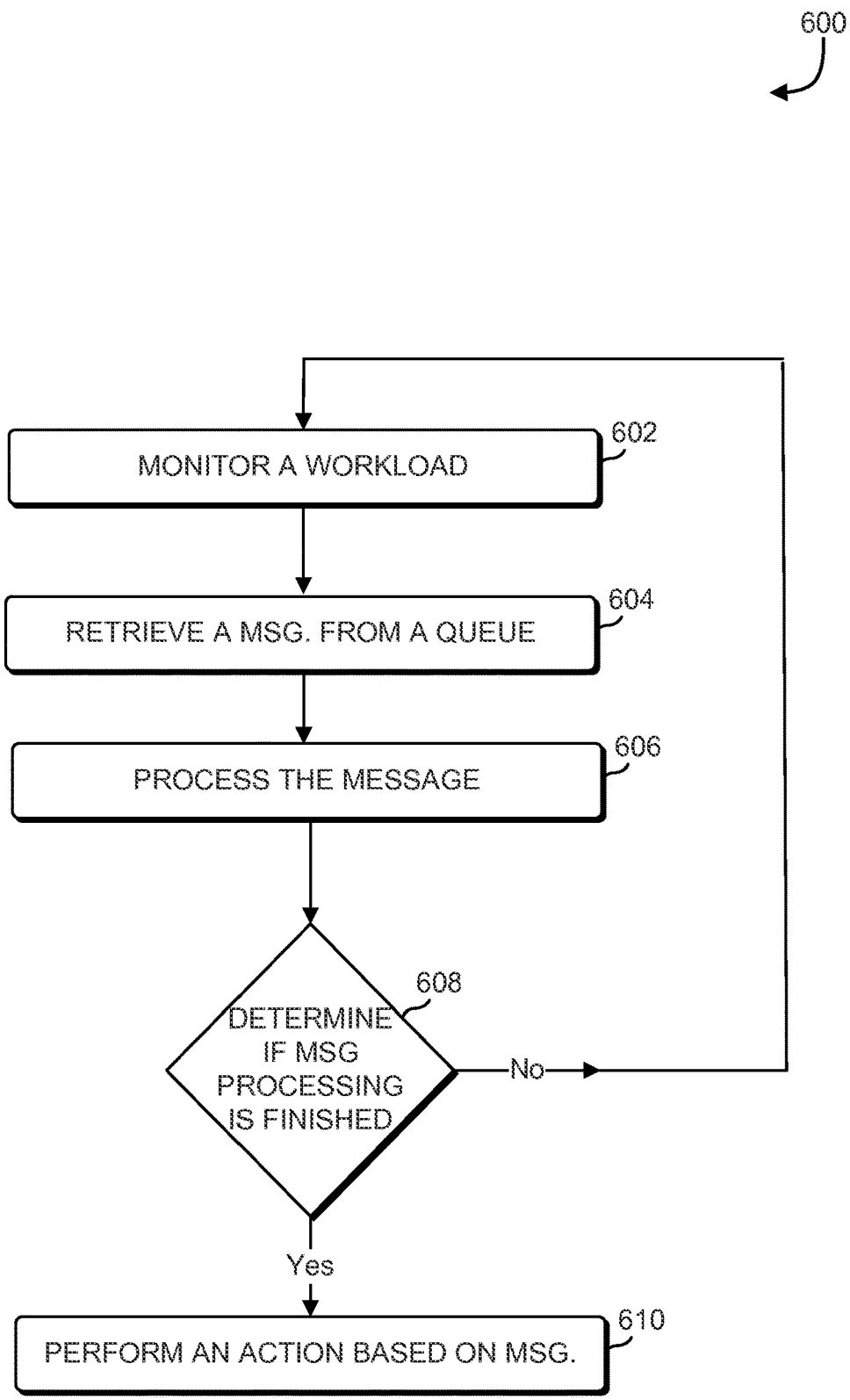
FIG. 6 is an illustrative example of a process for monitoring a workload for processing messages in accordance with at least one embodiment.

FIG. 6 is an illustrative example of a process 600 for monitoring a workload of a publication-subscription system while sub-dividing messages stored in queues into sizable portions, in accordance with some embodiments. The process 600 may be done by a monitoring service, such as the monitoring service 280 depicted and described in connection with FIG. 2 or a suitable component thereof.

As illustrated in FIG. 6, the process 600 may include monitoring a workload (602) to determine if additional messages are enqueued to be processed, such as by querying the message service queue or monitoring whether a message has been dequeued and processed. If it is determined that there is at least one or more messages in the message service queue, the process 600 may include one of the multiple message processor dequeuing and retrieving a message from the queue (604). At or around the time the message processor dequeued the pending message, the message processor may process the message accordingly (606). For example, the message processor may review the information of the message (e.g., such as the metadata in the exploded view of message 205 as depicted and described in accordance with FIG. 2), may request information from a metadata service (e.g., such as any of the appropriate metadata services 330a-e as described and depicted in connection with FIG. 3), and/or receive subscription and delivery information from one of the metadata services.

Returning to FIG. 6, as indicated in the figure, the process 600 further determines, at the message processor, if the message processing is completed (608) or whether the message needs to be subdivided and reentered into the queue for further processing. If it is determined that the message has been completely processed (i.e., all children of the root fragment have been assigned a task) the message processor may perform a next action based on, for example, the metadata in the message or other external considerations. For example, the message processor may deliver the payload of the message to the subscribers of the topic or subscribers of the fragment of the topic (as depicted and described in connection with FIG. 5).

Returning to FIG. 6, when a message processor determines that a message requires additional processing (e.g., to further sub-divide the message into smaller components), the message processor or a component thereof may subdivide the message into smaller subsets and then provide the subdivided message back to the queue for further processing.

Some or all of the process 600 may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 7:
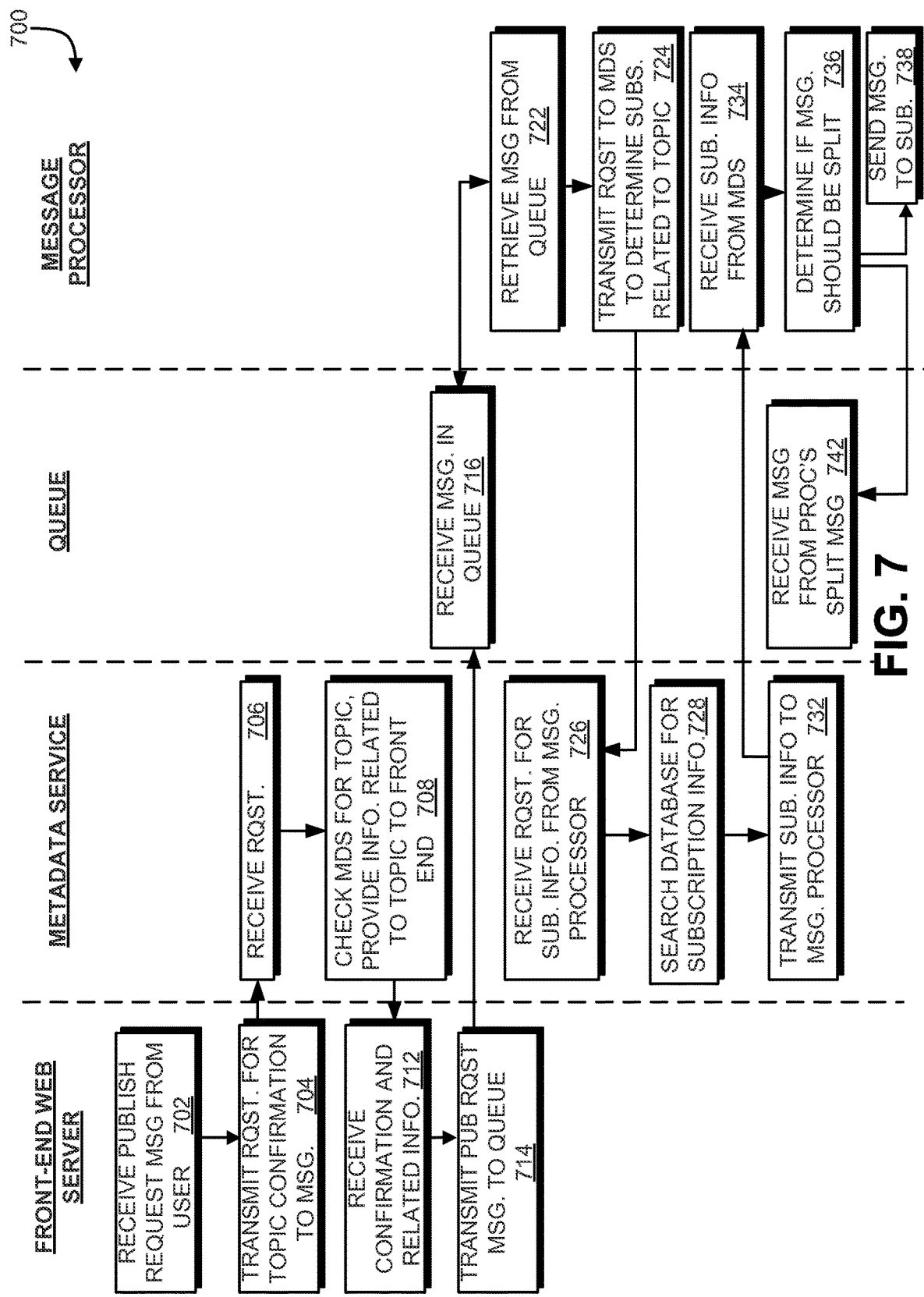
FIG. 7 is an illustrative example of swim diagram for retrieving and processing messages in accordance with at least one embodiment.

FIG. 7 is a swim diagram illustrating a process 700 for monitoring a workload of a publication-subscription system while sub-dividing messages stored in queues into sizable portions, in accordance with some embodiments. The process 700 may be performed, for example, by various components of the publication-subscription message queue service described in connection with at least FIGS. 1-3. For example, the process 700 may be performed by a front-end server, such as the web server 220, a messaging queue, such as the queue 240, a delivery service, such as the metadata services 230, and a processor, such as the message processor 250 all depicted and described in connection with FIG. 2 or a suitable component thereof.

Returning to FIG. 7, the process 700 includes at step 702, a front-end web server receiving a publish request message (PRM) from a customer of the publication-subscription system to publish a message to a topic. In step 704, the front-end web server transmits the PRM to a metadata service (MDS) to confirm that the topic currently exists. The MDS receives the request at step 706 and checks the MDS and/or the key value store operably interconnected to the MDS for the requested topic, at step 708. The MDS, at step 708, further provides information or data related to the topic that may be of use to create a well-formed published message to deliver to the subscribers; the MDS transmits the confirmation and any information, if found, to the web server.

At step 712, the front-end server receives the confirmation and related information from the MDS, and transmits the PRM to a queue, such as a distributed messaging queue, at step 714. The queue, at step 716, receives the PRM from the metadata service and maintains the PRM in temporary storage while awaiting a selection of the PRM by a message processor for processing the message. When the message processor is available to take additional workload, the message processor, at step 722, retrieves the PRM from the queue in anticipation of processing the PRM. At step 724, the message processor transmits a request to the metadata service to determine the subscriptions related to the topic to which the PRM was published. The metadata service, at step 726, which generally controls information related to fragments of topics, subscriber information, subscription information, and the like, receives the request for subscription information from the message processor. At step 728, the MDS searches a database, such as the key value store 225 as depicted and described in connection with FIG. 2, for subscription related information, and transmits the subscription information back to the message processor at step 732.

At step 734, the message processor now maintains information regarding the subscription (and possibly other related information on the subscriber, etc.), and has the retrieved PRM. At step 736, the message processor determines if the PRM should be sub-divided into smaller messages based on factors such as the size of the message and whether the processor can successfully and timely deliver the message to subscribers without needing additional services. If the message processor determines that the message is a small enough size for the message processor to simply deliver to all subscribers, at step 738, the message processor serves the message to all subscribers of the topic. If, however, the message processor determines that the PRM is too large, and would require too much work for just one processor, the message processor sub-divides the current message and transmits the sub-divided PRM back to the queue for further processing. At step 742, the queue receives the sub-divided message from the message processor, where the sub-divided message would be a fanned PRM that will again temporarily be stored in the queue until a next message processor (which could be the same message processor or a different message processor) is able to retrieve the fanned message for further processing.

In alternative example embodiments, the request queue can be monitored by the message processor or other system component to determine if there are requests to be processed that are currently being stored in the queue. If so, the message processor, having determined that it has sufficient processing capacity to process the request, may retrieve the PRM from the queue for processing of the message. In various embodiments, the request queue or a separate management subsystem may monitor the processing capacity of the message processor and determine if the message processor has sufficient capacity.

Some or all of the process 700 may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 8:
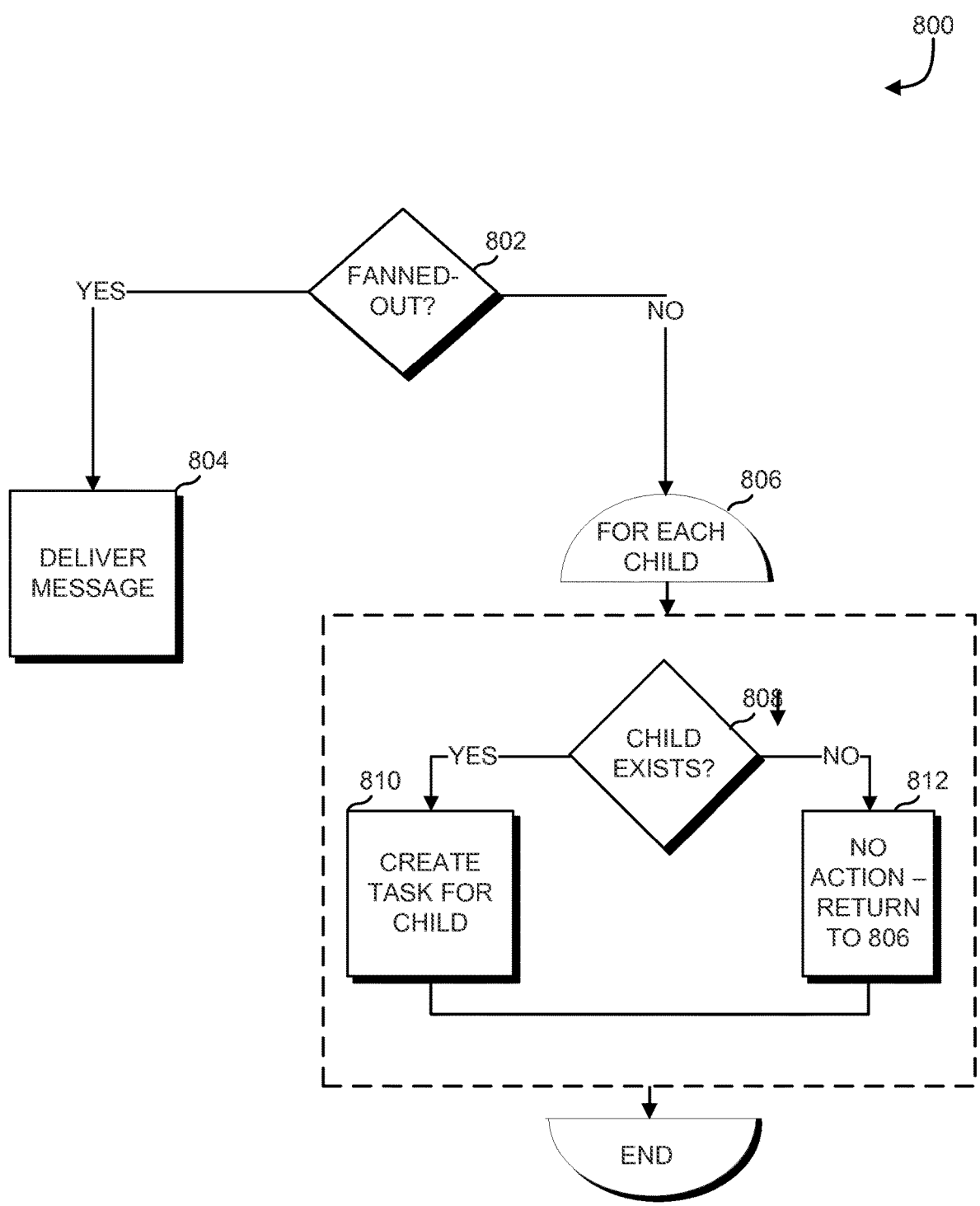
FIG. 8 is an illustrative example of a process for determining sub-dividing messages based on a fan out model in accordance with at least one embodiment.

FIG. 8 is an illustrative example of a process 800 for determining if the processing of the messages is complete, in accordance with some embodiments. The process 800 may be performed by a processor, such as the message processor 150 depicted and described in connection with FIG. 1 or a suitable component thereof.

Returning to FIG. 8, in an embodiment, the process 800 includes a processor determining if a message has been fanned-out such that if the message requires a sub-division, has the message been divided to the smallest necessary size (802). If the message has been fanned-out, which can be determined based on some of the metadata in the message, and then the message processor delivers the message to the subscribers (804). However, if the message has not been fanned-out, or has not been fanned-out completely, the message processor determines, for each child (808), if a child exists of the root fragment (808). If a child does not exist, then there is no action to be taken and the message may be returned to the queue and then the message processors to be delivered to the subscribers (812). However, if there is one or more children of the root, a task is created for that child (810) and the message is again provided to the queue and then to a message processor for further processing, until no children exist (810).

In alternative example embodiments, once a message processor has determined that a child does exist, the message processor may withdraw the message from the queue and continue to process that same message again for a next succession.

Some or all of the process 800 may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 9:
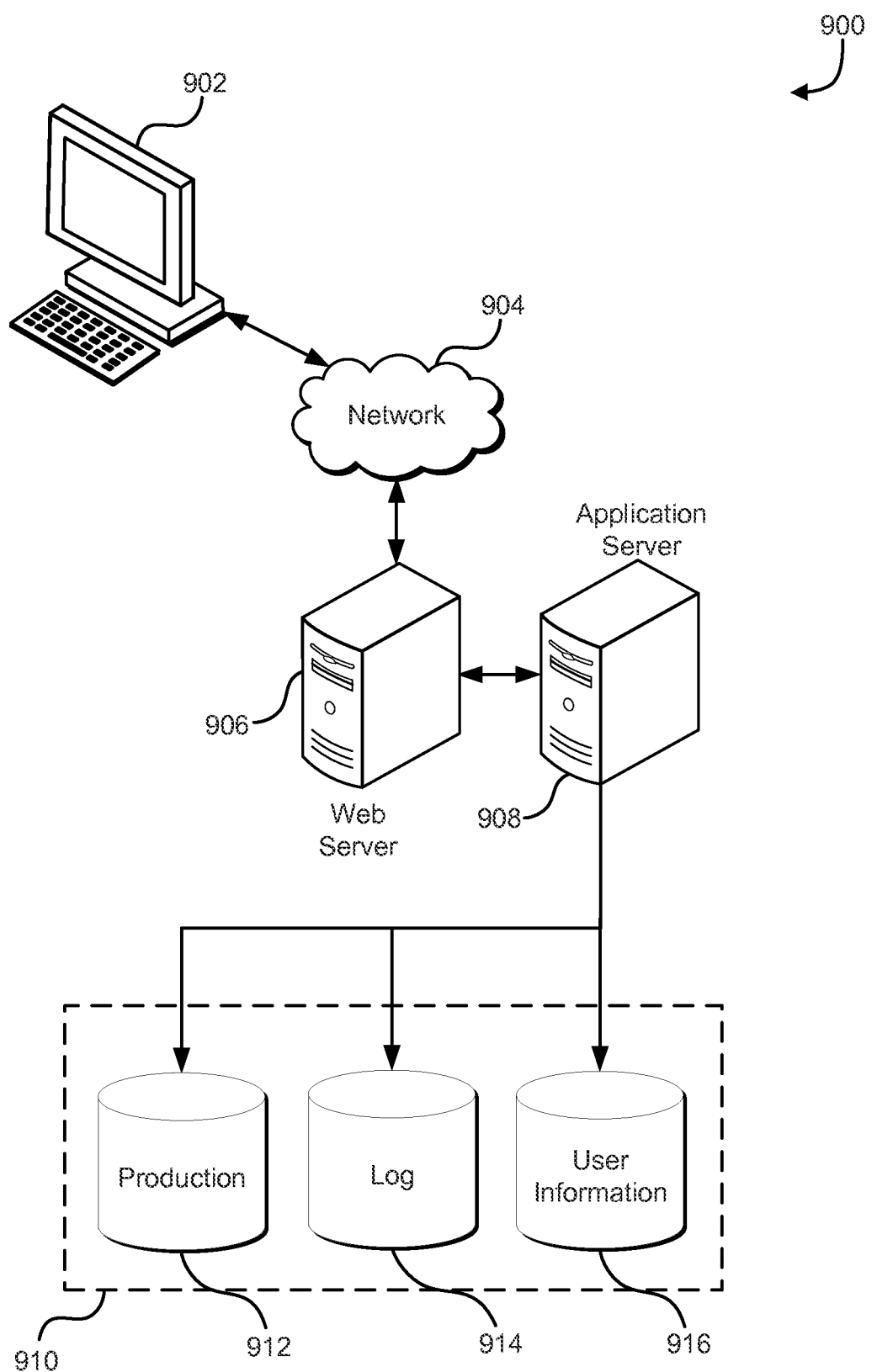
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising a set of computing devices that implement one or more services, the one or more services:
   receive a message;
   enqueue the message into a message queue accessible to a plurality of message processors, wherein a message processor of the plurality of message processors:
      obtains the message;
      determines, based at least in part on subscription information associated with the message, to split the message, the subscription information identifying subscribers to a topic, wherein the message is related to the topic;
      divides the message into a first split message and a second split message, the first split message and the second split message including respective identifiers that indicate a hierarchy within a fanned-out structure associated with the message, at least one of the identifiers indicating at least one additional split exists for the message; and
      enqueues the first split message and the second split message into the message queue based at least in part on at least one of the identifiers indicating at least one additional split exists for the message;
   delivers, based at least in part on an indicator identifying a fanned-out status as complete, the message to a set of subscribers.

2. The system of claim 1, wherein delivering the message to the set of subscribers includes transmitting a payload of the first and the second split messages to the set of subscribers.

3. The system of claim 1, further comprising determining an operation to perform for the message is based at least in part on a topic name, a first fragment identifier, a last fragment identifier, a current fragment identifier, and a fan-out indicator.

4. The system of claim 1, wherein the message is an initial publish request message.

5. The system of claim 1, wherein:
- a first message processor of the plurality of message processors:
  - obtains the first split message from the message queue; and
  - delivers the first split message; and
- a second message processor different from the first message processor:
  - obtains the second split message from the message queue; and
  - delivers the second split message.

6. A computer-implemented method, comprising:
- obtaining a message from a queue, wherein fulfillment of the message involves providing information to at least one subscriber; and
- as a result of determining subscriber information related to a topic identified in the message:
  - dividing the message into a plurality of split messages, wherein for each split message of the plurality of split messages:
    - fulfillment involves providing the information to the at least one subscriber; and
    - the split message includes an identifier associated with a hierarchy within a fanned-out structure associated with the message; and
  - as a result the identifier of one of the plurality of split messages indicating at least one additional split exists for the message, enqueuing the plurality of split messages, the plurality of split messages being accessible to a plurality of message processors.

7. The computer-implemented method of claim 6, further comprising:
- receiving a subscription request for an endpoint; and
- as a result of receiving the subscription request, transmitting a another message to a metadata service, wherein the metadata service is to determine an availability status of a fragment.

8. The computer-implemented method of claim 7, further comprising:
- as a result of the availability status of the fragment being full, creating a new fragment; and
- updating new fragment information in a metadata service instance.

9. The computer-implemented method of claim 6, wherein a first split message of the plurality of split messages indicates a level in a hierarchy has been processed and a second split message of the plurality of split messages indicates a level in a hierarchy has not been processed, enqueuing the second split message based on the level in the hierarchy.

10. The computer-implemented method of claim 6, further comprising:
- retrieving a new message from a queue; and
- publishing a payload of the new message when a fan-out indicator is set to true.

11. The computer-implemented method of claim 6, wherein each of the plurality of split messages is retrievable by a different message processor of the plurality of message processors.

12. The computer-implemented method of claim 6, further comprising:
- determining a current fragment identifier and a last fragment identifier based on the information in each of the split message of the plurality of split messages; and
- causing a payload of the split message to be transmitted to the at least one subscriber when the current fragment identifier is equal to the last fragment identifier.

13. A non-transitory computer-readable storage medium comprising executable instructions that, as a result of being executed by one or more processors of a computer system, cause the computer system to:
- retrieve at least one message;
- determine an operation to perform for the at least one message, the operation being determined from a set of operations that comprises:
  - splitting based at least in part on a topic in the at least one message and subscription information associated with the topic; and
  - delivering based at least in part on an indicator identifying a fanned-out status associated with the at least one message;
- determine, based on the topic, the subscription information corresponding to the at least one message;
- as a result of the determined operation being splitting, divide the at least one message into a plurality of split messages, the plurality of the split messages having indicators associated with hierarchies of the split messages in a fanned-out structure;
- enqueue the plurality of split messages based at least in part on at least one of the identifiers of the plurality of split messages indicating at least one additional split exists for the at least one message; and
- as a result of the determined operation being delivery, cause at least one split message of the plurality of split messages to be provided to the at least one subscriber based at least in part on the subscription information.

14. The non-transitory computer-readable storage medium of claim 13, wherein the plurality of split messages are enqueued in a distributed message queue service, wherein the distributed message queue service is to include multiple messaging queues.

15. The non-transitory computer-readable storage medium of claim 13, wherein the executable instructions further comprise instructions that cause the computer system to determine an identifier that uniquely identifies a resource name of the topic of the at least one message, wherein the identifier is used in a hashing scheme.

16. The non-transitory computer-readable storage medium of claim 15, wherein the executable instructions that cause the computer system to determine the identifier that uniquely identifies the resource name of the topic include instructions that cause the computer system to perform a hashing scheme on the resource name to determine a metadata service instance maintaining information corresponding to the topic.

17. The non-transitory computer-readable storage medium of claim 13, wherein the executable instructions further comprise instructions that cause the computer system to determine when the split message indicates a level in a hierarchy that has been processed in order to determine a next operation to perform on the split message, wherein the hierarchy is a tree hierarchy.

18. The non-transitory computer-readable storage medium of claim 13, wherein the executable instructions further comprise instructions that cause the computer system to:
- determine a current fragment identifier and a last fragment identifier corresponding with the topic of the at least one message; and as a result of the current fragment identifier and the last fragment identifier being the same, cause a payload of the at least one message to be delivered.

19. The non-transitory computer-readable storage medium of claim 13, wherein the executable instructions further comprise instructions that cause the computer system to transmit a request for information to a metadata service instance, the information corresponding to a subscription to the topic of at least one subscriber, wherein the information corresponding to the subscription includes a subscriber identification, a subscriber endpoint identifier, and a subscriber endpoint protocol.

20. The non-transitory computer-readable storage medium of claim 19, wherein the executable instructions that cause the computer system to transmit the request for information to the metadata service instance further include instructions that cause the computer system to deliver a payload of the at least one split message to the at least one subscriber according to the subscription.

\* \* \* \* \*